(Model.)
H. B. SARGENT.
ANIMAL TRAP.
No. 295,056. Patented Mar. 11, 1884.
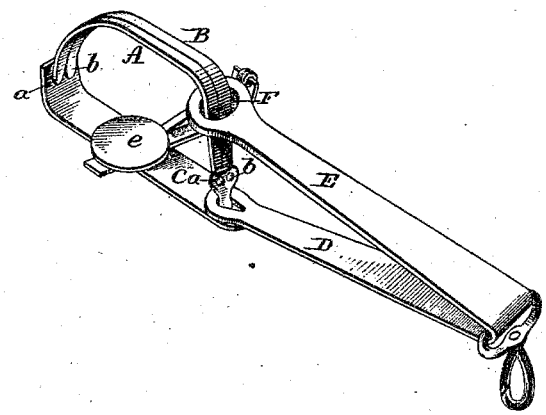
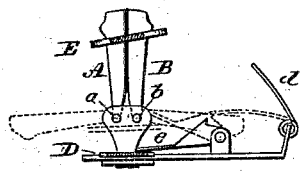
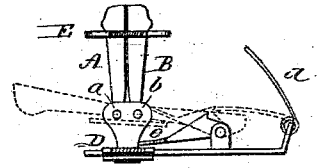
Witnesses.
Henry B. Sargent, Inventor
By Atty.

United States Patent Office.

HENRY B. SARGENT, OF NEW HAVEN, CONNECTICUT, ASSIGNOR TO SARGENT & CO., OF SAME PLACE.

ANIMAL-TRAP.

SPECIFICATION forming part of Letters Patent No. 295,056, dated March 11, 1884.

Application filed October 31, 1883. (Model.)

*To all whom it may concern:*

Be it known that I, HENRY B. SARGENT, of New Haven, in the county of New Haven and State of Connecticut, have invented a new Improvement in Animal-Traps; and I do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, a sectional end view from the rear, showing my improvement; Fig. 3, a sectional end view from the rear, illustrating the previous construction.

This invention relates to an improvement in that class of animal-traps which consist of a pair of U-shaped jaws, the ends of the U's hinged to a base at substantially a common center, and so as to open the one from the other into substantially the same plane; and in such opening a spring is compressed, the reaction of which tends to throw the jaws together, the jaws held by a trip in their open condition, so that the animal releasing the trip will be caught between the jaws, commonly called "steel-traps."

As in the usual construction of these traps, the two jaws A B are hinged to the base C, respectively, upon pivots $a\ b$ at the respective ends of the U-shaped jaws, and so that one may be turned from the other, as seen in broken lines, Fig. 3, coming into substantially the same plane. A V-shaped spring is applied, one leg, D, to the base, the other leg, E, constructed with an opening, F, to embrace the legs of the jaws, and so as to hold them in a closed position, as seen in Fig. 3; but when the spring is compressed, as indicated in broken lines, Fig. 3, then the jaws may be laid open, as seen in Fig. 3, and when so laid open a latch, $d$, is engaged with a trip, $e$, as seen in broken lines, Fig. 3, the latch lying over one jaw—say at the right—and when the trip and latch are engaged the jaws will be held in that open position until such time as the animal stepping or otherwise acting upon the trip will release the latch and permit the jaws to fly up into their closed position under the reaction of the spring. In the usual construction the two legs of the jaws stand in planes parallel to each other, as seen in Fig. 3. When the spring is compressed by the setting of the trap, it is held in such condition by one jaw only. This causes the active leg E of the spring to twist and throw the opposite jaw upward, so that the two jaws stand in a plane inclined to the base of the trap, as seen in broken lines, Fig. 3—that is, one side of the trap will be higher than the other. It is desirable to hold both jaws in a wide-open condition, and so that they will stand each in the same relation to the base, and as seen in broken lines, Fig. 2. The object of my invention is to produce this result; and it consists in twisting the active leg of the spring so that its highest side will bear first upon the locked jaw, and the other or lowest side will come later into contact with the opposite jaw, as more fully hereinafter described.

Other than the construction of the spring the trap is of usual construction, and the description which I have before given is sufficient.

The spring is made in the usual V shape; but instead of making the bearing end of the two legs D E in the same plane I twist the movable end out of that plane, as seen in Fig. 2, the highest side being on the side of the locked jaw; hence when the spring is depressed and the jaw B locked upon it, as seen in broken lines, Fig. 2, the force which imparts a twist to the jaw, tending to raise the opposite side and throw up the jaw on that side, only brings the previously-twisted jaw into a plane substantially parallel with the plane of the fixed end of the jaw, as seen in Fig. 2, and whereby the two jaws bear alike upon the two sides of the spring, and therefore stand in the same relation to the spring, and leave the jaws wide open, one side no higher than the other, as indicated in broken lines, Fig. 2.

I claim—

The herein-described improvement in steel-traps, consisting in the spring, its active end twisted to bring it into a plane inclined to the base of the trap, the highest side being that which bears upon the jaw over which the trip is engaged, and whereby, when the trap is set, the locked jaw will bring the said twisted end into a plane substantially parallel with the base of the trap and hold the jaws in a corresponding parallel plane, and substantially as specified.

HENRY B. SARGENT.

Witnesses:
A. W. PARMELEE,
P. F. SMITH.